United States Patent [19]

Wright et al.

[11] Patent Number: 5,278,261
[45] Date of Patent: Jan. 11, 1994

[54] ARYLENE SULFIDE COPOLYMER COATING COMPOSITIONS AND PROCESSES

[75] Inventors: Roy F. Wright; Michael C. Yu, both of Bartlesville, Okla.

[73] Assignee: Phillips Petroleum Company, Bartlesville, Okla.

[21] Appl. No.: 986,930

[22] Filed: Dec. 8, 1992

Related U.S. Application Data

[62] Division of Ser. No. 411,811, Sep. 25, 1989, Pat. No. 5,189,121.

[51] Int. Cl.$^5$ .............................................. C08F 283/00
[52] U.S. Cl. ..................................... 525/537; 528/388; 427/385.5; 427/388.1; 427/389.7; 427/393.5
[58] Field of Search ............... 427/385.5, 388.1, 389.7, 427/393.5; 528/388; 525/537

[56] References Cited

U.S. PATENT DOCUMENTS

| | | | |
|---|---|---|---|
| 3,354,129 | 11/1967 | Edmonds, Jr. et al. | 260/79 |
| 3,616,186 | 10/1971 | Blackwell | 428/461 |
| 3,869,434 | 3/1975 | Campbell et al. | 260/79.1 |
| 3,919,177 | 11/1975 | Campbell | 260/79.1 |
| 3,928,661 | 12/1975 | Higbee et al. | 528/373 |
| 3,966,688 | 6/1976 | Campbell | 260/79 |
| 3,988,286 | 10/1976 | Edmonds, Jr. et al. | 260/37 R |
| 4,820,759 | 4/1989 | Ichikawa et al. | 525/537 |
| 4,837,294 | 6/1989 | Ichikawa et al. | 525/537 |

FOREIGN PATENT DOCUMENTS

| | | |
|---|---|---|
| 0189895 | 6/1986 | European Pat. Off. |
| 0257228 | 3/1988 | European Pat. Off. |
| 0286298 | 10/1988 | European Pat. Off. |
| 2192831 | 1/1988 | United Kingdom |
| 2205572 | 12/1988 | United Kingdom |

*Primary Examiner*—John C. Bleutge
*Assistant Examiner*—Helen F. Lee
*Attorney, Agent, or Firm*—Dougherty, Hessin, Beavers & Gilbert

[57] ABSTRACT

Low temperature heat curable arylene sulfide copolymer compositions which are particularly suitable for use in coating applications are provided. The compositions basically comprise a first arylene sulfide copolymer having unsubstituted para- and ortho-aromatic sulfide repeating units in the polymer chain, and a second arylene sulfide copolymer having unsubstituted para-aromatic sulfide repeating units and alkyl-substituted aromatic sulfide repeating units in the polymer chain.

11 Claims, No Drawings

5,278,261

ARYLENE SULFIDE COPOLYMER COATING COMPOSITIONS AND PROCESSES

This is a divisional of copending application(s) Ser. No. 07/411,811 filed on Sep. 25, 1989, now U.S. Pat. No. 5,189,121.

BACKGROUND OF THE INVENTION

1. Field of the Invention

The present invention relates generally to arylene sulfide copolymer coating compositions and processes, and more particularly, to low temperature heat curable arylene sulfide copolymer blends, coating compositions including such blends and processes of coating substrates.

2. Description of the Prior Art

Poly(arylene sulfide) resins have properties such as excellent thermal stability and chemical resistance which make the resins useful for coating substrates. Coating-grade poly(phenylene sulfide) resins are generally prepared substantially in accordance with the basic method described in U.S. Pat. No. 3,354,129 issued Nov. 21, 1967, whereby a mixture containing paradichlorobenzene, sodium hydroxide, a sulfur source such as sodium hydrosulfide and a polar organic reaction medium such as N-methylpyrrolidone is caused to react. The resulting poly(p-phenylene sulfide) resins can be applied to a substrate as a finely divided solid in a slurry and cured by heating in air to form a tough, chemical-resistant coating on the substrate.

In order to form a continuous, smooth and flexible coating on the substrate, it is generally necessary to cure the poly(p-phenylene sulfide) resin at a temperature above about 370° C. Such a high cure temperature has the disadvantages of requiring special heating equipment which increases the cost of the coating procedure, and limiting the types of substrates on which the coating can be applied. That is, some substrate materials are degraded by exposure to temperatures as high as 370° C., and therefore, coatings of poly(p-phenylene sulfide) resin cannot be utilized on such substrates.

Thus, there is a need for coating compositions of arylene sulfide polymers which can be cured at relatively low temperatures whereby special equipment is not required and heat sensitive substrates are not damaged when the coating composition is cured.

SUMMARY OF THE INVENTION

The present invention meets the above described need by providing a low temperature heat curable arylene sulfide copolymer blend composition, a coating composition including said arylene sulfide copolymer blend and an improved low temperature process for coating a substrate with a heat curable arylene sulfide copolymer composition. The low temperature heat curable blend composition is a blend of two arylene sulfide copolymers, the first of which is comprised of unsubstituted para-aromatic sulfide repeating units and unsubstituted ortho-aromatic sulfide repeating units in the polymer chain. The second arylene sulfide copolymer in the blend is comprised of unsubstituted para-aromatic sulfide repeating units and alkyl-substituted aromatic sulfide repeating units in the polymer chain. The first arylene sulfide copolymer is present in the blend composition in an amount in the range of from about 10% to about 90% by weight of the composition.

A preferred low temperature heat curable arylene sulfide copolymer blend composition of this invention is comprised of a first arylene sulfide copolymer having in the range of from about 65 mole % to about 95 mole % unsubstituted paraphenylene sulfide repeating units in the polymer chain, and in the range of from about 5 mole % to about 35 mole % unsubstituted ortho-phenylene sulfide repeating units in the polymer chain. A second arylene sulfide copolymer is included in the composition having in the range of from about 65 mole % to about 95 mole % unsubstituted para-phenylene sulfide repeating units in the polymer chain, and in the range of from about 5 mole % to about 35 mole % methylsubstituted phenylene sulfide, i.e., p-xylene sulfide repeating units. The first arylene sulfide copolymer is present in the blend composition in an amount in the range of from about 20% to about 80% by weight of the composition.

The heat curable coating compositions of the present invention include the above described arylene sulfide copolymer blend composition and optionally a carrier fluid, an inorganic filler, a pigment and other additives.

The process of the invention for coating a substrate with a heat curable arylene sulfide copolymer composition comprises the steps of mixing the above described arylene sulfide copolymer blend composition with one or more of the above-described optional additives, applying the mixture to a substrate and heating the mixture on the substrate to a temperature and for a time sufficient to cure the mixture.

It is, therefore, a general object of the present invention to provide arylene sulfide copolymer coating compositions and processes.

A further object of the present invention is the provision of heat curable arylene sulfide copolymer coating compositions which can be cured at relatively low temperatures.

Another object of the present invention is the provision of an improved process for coating a substrate with an arylene sulfide copolymer coating composition at a low temperature whereby a continuous, tough, flexible chemical resistant coating is formed.

Other and further objects, features and advantages of the present invention will be readily apparent to those skilled in the art upon a reading of the description of preferred embodiments which follows.

DESCRIPTION OF PREFERRED EMBODIMENTS

The present invention provides low temperature heat curable arylene sulfide copolymer blend compositions which are particularly suitable for use in substrate coating applications. Heat curable coating compositions including the arylene sulfide copolymer blends are also provided as well as improved processes for coating substrates utilizing the coating compositions.

Arylene sulfide copolymers which can be used in accordance with this invention can be prepared by any polymerization procedure applicable to their production. For example, poly(phenylene sulfide) can be prepared by subjecting the sodium salt of chlorothiophenol to polymerization conditions. Similarly, a mixture comprising dicholorobenzene, sulfur and sodium carbonate can be subjected to polymerization conditions to produce poly(phenylene sulfide). However, a preferred process for producing the arylene sulfide polymers utilized in accordance with the present invention is generally described in U.S. Pat. No. 3,354,129 issued Nov. 21, 1967, and employs a dihaloaromatic compound, an alkali metal sulfide, either anhydrous or hydrated, and an organic amide.

The arylene sulfide copolymers produced include two different aromatic sulfide repeating units represented by

wherein Ar represents an unsubstituted or alkyl-substituted arylene radical such as phenylene, naphthylene, biphenylene, and the like. Such repeating units are referred to herein as aromatic sulfide repeating units.

Most preferably, the aromatic sulfide repeating units are selected from an unsubstituted para-aromatic sulfide repeating unit, an unsubstituted ortho-aromatic repeating unit or an alkyl-substituted aromatic unit wherein the alkyl group contains from one to three carbon atoms. Specific preferred such aromatic repeating units are para-phenylene sulfide units, ortho-phenylene sulfide units and alkyl substituted aromatic units selected from toluene sulfide or p-xylene sulfide.

The low temperature heat curable arylene sulfide copolymer blend compositions of this invention are comprised of a first arylene sulfide copolymer having unsubstituted para- and ortho-aromatic sulfide repeating units in the polymer chain blended with a second arylene sulfide copolymer having unsubstituted para-aromatic sulfide repeating units and alkyl-substituted aromatic sulfide repeating units in the polymer chain. The first arylene sulfide copolymer is present in the blend composition in an amount in the range of from about 10% to about 90% by weight of the composition.

The first arylene sulfide copolymer should have in the range of from about 65 mole % to about 95 mole % unsubstituted para-aromatic sulfide repeating units in the polymer chain, and in the range of from about 5 mole % to about 35 mole % ortho-aromatic sulfide repeating units in the polymer chain. The second arylene sulfide copolymer should have in the range of from about 65 mole % to about 95 mole % unsubstituted para-aromatic sulfide repeating units in the polymer chain, and in the range of from about 5 mole % to about 35 mole % alkyl-substituted aromatic sulfide repeating units in the polymer chain.

The first arylene sulfide copolymer can be produced by the polymerization of para- and ortho- dihaloaromatic compounds, e.g., para- and ortho- dichlorobenzene in a polymerization process of the type described above. Similarly the second arylene sulfide copolymer can be produced by polymerizing an unsubstituted para-dihaloaromatic compound with an alkyl-substituted aromatic compound. More specifically, in producing the first arylene sulfide copolymer, a reaction mixture containing from about 65 mole % to about 95 mole %, based on the total moles of aromatic starting materials, of an unsubstituted para-dihaloaromatic compound; from about 5 mole % to about 35 mole % of an unsubstituted ortho-dihaloaromatic compound; a sulfur source such as sodium sulfide, sodium hydrosulfide, elemental sulfur or hydrogen sulfide; a base such as an alkali metal or alkaline earth metal hydroxide present in an excess molar amount with respect to the amount of the sulfur present, preferably an excess amount of from about 2 to about 15 % by weight; and a liquid polar organic medium, preferably N-methylpyrrolidone, present in an amount of from about 2 to about 10 moles per mole of the sulfur source present. The reaction mixture is maintained under polymerization conditions for a time of about 1 hour to about 10 hours to produce the arylene sulfide copolymer. The copolymer is recovered from the polymerization reaction mixture by any suitable means such as flash distillation of the polar organic medium or aqueous extraction of the reaction mixture and filtration to recover the copolymer as a solid. The solid copolymer is then washed, preferably with water at a temperature greater than about 100° C., i.e., from about 120° C. to about 250° C., most preferably from about 150° C. to about 200° C. Such hot water washing produces a copolymer which cures at a lower temperature than a resin washed with cool water.

The second arylene sulfide copolymer can be produced in the same manner as described above except that aromatic starting materials comprised of an unsubstituted para-dihaloaromatic compound in an amount of from about 65 mole % to about 95 mole % and an alkyl-substituted aromatic compound in an amount of from about 5 mole % to about 35 mole %, based on the total moles of aromatic starting materials, are utilized.

In preparing the most preferred first arylene sulfide copolymer containing unsubstituted para- and ortho-phenylene sulfide repeating units, aromatic starting materials consisting of para-dichlorobenzene and ortho-dichlorobenzene are utilized. In preparing the most preferred second arylene sulfide copolymer containing unsubstituted para-phenylene sulfide repeating units and methyl-substituted phenylene sulfide repeating units in the polymer chain, aromatic starting materials comprised of para-dichlorobenzene and 2,5-dichloro-p-xylene are utilized.

The most preferred arylene sulfide copolymer blend composition of this invention is comprised of a first arylene sulfide copolymer having from about 80 mole % to about 90 mole % unsubstituted para-phenylene sulfide repeating units in the polymer chain and from about 10 mole % to about 20 mole % unsubstituted ortho-phenylene sulfide repeating units in the polymer chain, and a second arylene sulfide copolymer having from about 80 mole % to about 90 mole % unsubstituted para-phenylene sulfide repeating units and from about 10 mole % to about 20 mole % p-xylene sulfide repeating units in the polymer chain, each of the first and second arylene sulfide copolymers being present in an amount of about 50% by weight of the blend composition.

The heat curable arylene sulfide copolymer blend compositions described above exhibit satisfactory cure rates and good coating quality at curing temperatures below about 350° C. The most preferred blend composition described above produces good coating quality at curing temperatures in the range of from about 280° C. to about 320° C. in curing times in the range of from about 30 to about 60 minutes.

The arylene sulfide copolymer blend composition as described above is preferably an intimate mixture of finely divided arylene sulfide copolymers and any optional additives used therewith. A suitable particle size is about 60 mesh U.S. Sieve Series or smaller, and to achieve particle size reduction as well as good mixing, a ball or rod mill or the equivalent can be used.

The heat curable coating compositions of this invention are comprised of the heat curable arylene sulfide copolymer blend composition described above, either alone or admixed with optional additives such as inorganic fillers, pigments, surface active agents, and the like. The coating compositions can be applied to a substrate in powder form using any suitable technique. For example, a fluidized process can be used wherein a fluidizing agent, e.g. silica, is added to the composition used in an amount of from about 0.5% to about 10% by weight. An alternate technique which is most often utilized is to combine the heat curable arylene sulfide copolymer blend composition and optional additives used with a carrier liquid whereby a slurry is formed. Suitable carrier fluids are those selected from the group consisting of water, ethylene glycol, propylene glycol, glycerol, methyl alcohol, ethyl alcohol, isopropyl alcohol and mixtures thereof. The most preferred carrier liquid is propylene glycol. Suitable inorganic fillers can be selected from the group consisting titanium dioxide, carbon black, calcium carbonate, silica and mixtures thereof.

A preferred coating composition in slurry form is comprised of an arylene sulfide copolymer blend composition described above present in the coating composition in an amount in the range of from about 15% to about 60% by weight of the composition, an inorganic filler of the type described above, preferably titanium dioxide, present in an amount in the range of from about 0% to about 20% by weight of the composition and a carrier liquid of the type described above, preferably propylene glycol, present in an amount in the range of from about 20% to about 85% by weight of the composition. The coating composition is preferably mixed to produce a slurry, and then ball milled for up to 24 hours to yield an intimate homogeneous slurried mixture of the copolymers and additives utilized.

In carrying out the process of this invention for coating a substrate, the above described coating composition is applied to a substrate by any suitable method. After application of the composition to the substrate, the composition is heated in an oxygen-containing atmosphere such as air to a temperature above about 285° C. for a time period which can range from several minutes up to about 24 hours. The particular time required will depend upon various factors including the particular coating composition used, the substrate environment, the curing temperature, etc., but will usually be within the range of from about 8 minutes to about 1½ hours. Preferably, the curing time is 30 minutes or less. If desired, the coating can be annealed after curing by heating the coated substrate to a temperature above about 110° C., preferably a temperature in the range of from about 180° C. to about 250° C. for a time period ranging from about 20 minutes to about 12 hours.

When a coating composition in slurry form is applied to a substrate, any suitable method such as brushing, spraying or dipping can be used. The carrier liquid is removed by, for example, evaporation prior to or during the curing process. For any method of coating that is used, a primer such as cobalt oxide can be applied to the substrate prior to the application of the coating composition.

The arylene sulfide copolymer coating of this invention can be applied to a variety of substrates such as metal, glass, ceramic and plastics. The substrate can be in any form including sheet, wire, pipe, coupons, etc. The coating compositions and processes of this invention are particularly useful for coating wire and pipe.

The cured arylene sulfide copolymer coatings applied to a substrate in accordance with the above described process are continuous, tough, chemical resistant and flexible, and as a result of the low temperature curing involved, are economical to apply.

In order to further illustrate the heat curable compositions and processes of this invention, the following examples are given:

EXAMPLE I

This example describes the preparation of various copolymeric poly(phenylene sulfide), PPS, resins from a reaction mixture containing p-dichlorobenzene, sodium hydrosulfide (NaSH), sodium hydroxide, N-methyl-2-pyrrolidone (NMP), and the comonomer, o-dichlorobenzene.

Polymerization reactions were performed in a one-liter stainless steel autoclave manufactured by Autoclave Engineers, Inc. The autoclave was equipped with a stirrer with a speed of from 290 to 360 rpm and a distillation column for removal of liquid. The heating, cooling and valve opening were controlled by a Honeywell digital control programmer DCP-7700. Temperature and pressure during reaction were recorded on a Eurotherm Chessell chart recorder model 301. The poly(phenylene sulfide) copolymers described in Table I were prepared in a typical 1.00 mole scale reaction according to procedures described herein.

The autoclave was charged with 1.00 mole NaSH (96.37 gram of a commercial aqueous solution containing 58.17% . NaSH), 1.15 mole NaOH (46.00g, Reagent Grade), and 200 grams of N-methyl-2-pyrrolidone (recycled NMP from a pilot plant). The autoclave was sealed and heated with the reactor open to the distillation column according to a dehydration temperature program. The temperature was allowed to rise to 160° C. in 30 minutes and to increase to 205° C. in the next 30 minutes. During this period a total of at least 40 ml, up to 46 ml, of liquid was collected. The reactor was then cooled to 180° C. automatically and the solenoid valve for distillation was closed.

A mixture of p-dichlorobenzene (144.06g, 0.98 mol), the comonomer o-dichlorobenzene (7.35g, 0.05 mol), and 80g of NMP was transferred to a charging cylinder. The charging cylinder was pressurized to 100 psi and purged three times with nitrogen. To prevent DCB solidification, the charging cylinder was heated by a heat gun. The DCB solution was introduced into the autoclave under 100 psi of nitrogen. The charging cylinder was rinsed with 50 ml of NMP. The above-mentioned degassing procedure was used again. NMP was then introduced directly into the autoclave so as to make the total amount of NMP for reaction to be about 330g. The valve for charging DCB was then closed.

The reaction sequence which was controlled by the programmer allowed the temperature to reach 235° C. in 30 minutes and caused it to be maintained at 235° C. for 1 hour. The pressure gradually increased from 65 psi to 120-140 psi in this period. The temperature was then increased to 265° C. in 20 minutes and maintained at that temperature for 2 hours. During this period, pressure usually increased to 200-230 psi in 50 minutes and remained at that pressure for the remaining time. The stirring and heating were stopped automatically and the autoclave was allowed to cool overnight.

The autoclave was opened and the crude product was washed with 2 liters of hot (80 -90° C.) deionized water. The crude product was stirred with an appropriate amount of water in a Waring blender The product was further washed five times with 2 liters of hot deionized water. The washed product was then washed with 400 ml of deionized water at 175° C. in a 1 liter autoclave. After filtration, the recovered polymer was dried in a vacuum at 80° C. for at least 16 hours. The recovered polymer, 98.97 grams (91.6 weight percent yield) was an off-white powder, having an inherent viscosity of 0.11, an extrusion rate of 250 grams/10 minutes and an ash content of 0.39 weight percent.

The above general procedure was repeated using varying amounts of a comonomer, namely, o-dichlorobenzene, 2,4-dichlorotoluene or 2,5-dichloro-p-xylene and of the basic component, sodium hydroxide. The properties of the copolymers are listed in Table 1. Polymers A and B were made with o-dichlorobenzene (o-DCB) as comonomer, Polymer C was made with 2,4-dichlorotoluene (DCT) as comonomer and Polymers D through I were made with 2,5-dichloro-p-xylene (DCX) as comonomer.

The inherent viscosity measurements were made at a polymer concentration of 0.4 grams polymer in 100ml 1-chloronaphthalene solution at 206° C. The extrusion rate was measured by ASTM D 1238, Procedure B, modified by employing a temperature of 315.6° C., a die having a smooth straight bore 0.0825 ±0.002 inch diameter×1.250 ±0.0002 inch length and a total driving weight including piston of 345 grams.

=cracks; 4 =complete rupture. If the coating at this point passed with a rating of 1 or 2, the coating was heated at 450° F. for 2 hours, and the annealed coating was again evaluated using the mandrel bend test. The results from the mandrel bend test are listed in Table II.

PPS copolymers were prepared which required a lower bake temperature (e.g., 260°-316° C.) than the normal bake temperature of 399° C. for PPS homopolymer (Run 1). This was possible through the use of at least 5 mole percent comonomer (Polymers A, B, C, D and E, Runs 2, 3, 4, 5, 6 and 7) during the polymerization process. Compositions containing copolymers with greater than 5 mole percent DCX comonomer (Polymers F, G, H and I, Runs 8-11) failed to pass the mandrel bend test at bake temperatures of 200°, 288° or 316° C. for 30 minutes. A mixture of each of the DCX copolymers with high-cure temperature PPS homopolymer (Polymer V-1) in the coating formulation (slurry) gave coating compositions that pass the mandrel bend test at a bake temperature of 316° C. for 30 minutes (Runs 12, 13, 18 and 20). Some of such binary mixtures gave compositions that failed the mandrel bend test (Runs 14, 17 and 19).

Those compositions that passed the mandrel bend test contain an increasing higher fraction of PPS homopoly-

TABLE I

| | Characterization of PPS Homopolymers and Copolymers | | | | | | | | |
|---|---|---|---|---|---|---|---|---|---|
| | HOMO-POLYMER | COPOLYMERS | | | | | | | |
| Aromatic Material(s) | p-DCB | p-DCB/o-DCB | | p-DCB/DCT | p-DCB-DCX | | | | |
| Polymer Code | V-1 | A | B | C | D | E | F | G | H | I |
| Monomer Ratio | — | 95/5 | 85/15 | 95/5 | 95/5 | 95/5 | 90/10 | 85/15 | 80/20 | 75/25 |
| Comonomer Mole % | — | 5 | 15 | 5 | 5 | 5 | 10 | 15 | 20 | 25 |
| Inherent Viscosity, dl/g[a] | — | 0.11 | 0.13 | 0.11 | 0.14 | 0.18 | 0.08 | 0.15 | 0.07 | 0.07 |
| Extrusion Rate, gm/10 min[b] | 31 | 250 | 150 | 195 | 34 | 40 | 3600 | 59 | 1000 | 2500 |
| Ash, Weight % | 0.97 | 0.39 | 1.32 | 1.09 | 0.91 | 0.57 | 1.19 | 1.01 | 0.88 | 0.74 |
| Melting Temperature, Tm, °C. | — | — | — | — | — | 272 | 256 | 231 | 216 | 189 |
| Excess NaOH, Mole % | — | 15 | 5 | 5 | 5 | 5 | 3 | 3 | 3 | 3 |

[a]ASTM D 1243 - 0.4 grams polymer in 100 ml 1-chloronaphthalene solution at 206° C.
[b]ASTM D 1238 modified with die of longer bore and reduced driving weight.

EXAMPLE II

This example describes the procedure used to evaluate the polymers prepared in Example I. The amounts of ingredients varied somewhat between the different coating formulations, but the ratios of ingredients were essentially the same. Thus, a typical coating formulation was prepared by mixing for 5 to 10 minutes in a Waring ® blender about 100 parts by weight of the polymers, 33 parts by weight of TiO$_2$ and 200-300 parts by weight of propylene glycol. Optionally, the slurry was ball-milled for up to 24 hours to yield an intimate mixture of the polymers and additives.

The resulting slurry was spread with a coating rod over 3 inch×6 inch×0.035 inch steel panels which had been precleaned by vapor degreasing or with acetone followed by heating in a forced air oven at 370° C. for one hour and cooling to room temperature. The coated panels were placed in a circulating air oven (260-316° C.) for 15-60 minutes as desired, removed from the oven and cooled to room temperature. The coating procedure was repeated to provide second and third coats. After the third coat cooled, the coated panels were bent 180° over a 3/16 inch mandrel. Any cracks or other coating ruptures were noted and the coating was evaluated as follows: 1 =no cracks; 2 =micro cracks; 3 mer as the mole percent comonomer DCX present in the copolymer fraction increases. When the mole percent of alkyl-substituted para aromatic units in the total PPS polymer mixture is less than about 5 mole percent, the coating composition passes the mandrel bend test. Compositions that fail the mandrel bend test have greater than 5 mole percent alkylsubstituted para aromatic units in the PPS homopolymer-PPS copolymer mixture.

Unexpectedly, the coating composition (Run 16) that contained a mixture of two copolymers (Polymers B and G) passes the mandrel bend test when baked at 288° C. for 30 minutes. Polymer B (Run 3 and 4) and Polymer G (Run 9), when each is present alone in the coating composition, both fail the mandrel bend test at 288° C./30 minutes bake condition. In Run 16 the alkyl-substituted para aromatic unit mole percent present in the polymer mixture(s) exceeds by a factor greater than two the minimum amount observed to be necessary for a mixture of homopolymer and DCX copolymers to pass the mandrel bend test. Only the p-DCB/DCX copolymers containing 5 mole percent DCX (polymers D and E, runs 6 and 7 ) passed the mandrel bend test at the 288° C./30 minute bake condition.

A terpolymer having a mole ratio of unsubstituted para/unsubstituted ortho/alkyl-substituted para aromatic units of 85/7.5/7.5 failed to provide a satisfactory coating composition (Run 21). This mole ratio of aromatic units is equivalent to that present in the binary copolymer mixture used in Run 16 to produce a low cure temperature coating composition.

% to about 95 mole % unsubstituted para-aromatic sulfide repeating units in the polymer chain, and in the range of from about 5 mole % to about 35 mole % alkyl-substituted aromatic repeating units in the polymer chain.

2. The process of claim 1 wherein said unsubstituted para- and ortho-aromatic sulfide repeating units of said

TABLE II

Performance of PPS Copolymers and Blends as Coatings

| | Polymer Composition, Weight Percent | | | | Coating Test Rating[c] [Cure Cycle, Temperature-Time] | | | | | |
|---|---|---|---|---|---|---|---|---|---|---|
| Run | Homo-Polymer[a] | p-DCB/o-DCB Copolymer[b] | DCB/DCT | DCB/DCX | 316° C.-60 min | 316° C.-30 min. | 316° C.-15 min. | 288° C.-60 min. | 288° C.-30 min. | 260° C.-30 min. |
| 1 | 100 | — | — | — | requires cure temperature of 399° C. | | | | — | — |
| 2 | — | 100(A)[d] | — | — | — | 1(1) | — | — | 1(3) | — |
| 3 | — | 100(B) | — | — | 1(1) | 1(4) | — | 4 | 4 | — |
| 4 | — | 100(B)[e] | — | — | 1(1) | — | — | 4 | — | — |
| 5 | — | — | 100(C) | — | 1(1) | 1(1) | — | — | 4 | — |
| 6 | — | — | — | 100(E) | — | 1(4)[g] | 1(1) | 1(1) | 1(1) | 4[f] |
| 7 | — | — | — | 100(D) | — | 4[g] | — | — | 1(1) | — |
| 8 | — | — | — | 100(F) | — | 4[g] | — | — | 4(4) | 4 |
| 9 | — | — | — | 100(G) | — | 4[g] | — | — | 4(4) | 4(4) |
| 10 | — | — | — | 100(H) | — | 4[g] | — | — | 4(4) | 4(4) |
| 11 | — | — | — | 100(I) | — | 4[g] | — | — | 4(4) | 4(4) |
| 12 | 50 | — | — | 50(E) | 1(4) | 1(1) | 1(4) | 1(1) | — | — |
| 13 | 50 | — | — | 50(D) | — | 1(1) | 1(4) | 4 | 4(4) | — |
| 14 | 50 | — | — | 50(F) | — | 4(4) | 4(4) | 4 | 4(4) | — |
| 15 | 75 | — | — | 25(G) | — | 1(1) | 4(4) | 4 | 4(4) | — |
| 16 | — | 50(B) | — | 50(G) | — | — | — | — | 1(1) | 4[h] |
| 17 | 67 | — | — | 33(G) | — | 4(4) | 4(4) | 4 | 4(4) | — |
| 18 | 83 | — | — | 17(G) | — | 1(1) | 4(4) | 4 | 4(4) | — |
| 19 | 80 | — | — | 20(I) | — | 4(4) | 4(4) | 4 | 4(4) | — |
| 20 | 90 | — | — | 10(I) | — | 1(4) | 4(4) | 4 | 4(4) | — |
| 21 | Terpolymer p-DCB/o-DCB/DCX 85/7.5/7.5 mole % | | | | — | 4(4) | — | — | 4(4) | — |

[a]Commercial poly(p-phenylene sulfide) homopolymer from p-dichlorobenzene monomer, available from Phillips Petroleum Company as RYTON V-1 resin powder.
[b]Copolymer prepared from mixture of para- and ortho- isomers of dichlorobenzene.
[c]Mandrel bend rating, unannealed (annealed), rates 1 = no cracks, 2 = occasional microcracks, 3 = numerous microcracks some visible to unaided eye, 4 = complete rupture; continuous, easily visible cracking.
[d]Letter in parenthesis refers to polymer code in TABLE I.
[e]Coating slurry ball-milled overnight rated 1(1) after heating at 316° C. for 90 and 120 minutes and at 343° C. for 30 minutes.
[f]Polymer did not melt, powdery after cure.
[g]Very dark color, polymer degradation likely.
[h]Coating rated 1(1) after additional 30 minutes heating at 288° F.

We claim:

1. An improved process for coating a substrate with an arylene sulfide copolymer composition comprising the steps of:
   (a) applying a mixture to a substrate, said mixture comprising (i) a first arylene sulfide copolymer consisting essentially of unsubstituted para- and ortho-aromatic sulfide repeating units in the polymer chain and (ii) a second arylene sulfide copolymer consisting essentially of unsubstituted para-aromatic sulfide repeating units and alkyl-substituted aromatic sulfide repeating units in the polymer chain, said first arylene sulfide copolymer being present in said mixture in an amount in the range of from about 10% to about 90% by weight based on the combined amount of said first and second arylene sulfide copolymers present in said mixture and
   (b) heating the applied mixture at a temperature and for a time in an oxygen-containing atmosphere effective to cure said mixture and form a coating on said substrate
wherein said first arylene sulfide copolymer has in the range of from about 65 mole % to about 95 mole % unsubstituted para-aromatic sulfide repeating units in the polymer chain and in the range of from about 5 mole % to about 35 mole % ortho-aromatic sulfide repeating units in the polymer chain and said second arylene sulfide copolymer has in the range of from about 65 mole first arylene sulfide copolymer are para- and ortho-phenylene sulfide units, said unsubstituted para-aromatic sulfide repeating units of said second arylene sulfide copolymer are para-phenylene sulfide units, and said alkyl-substituted aromatic sulfide repeating units are toluene sulfide units or p-xylene sulfide units.

3. The process of claim 1 wherein said mixture further comprises a carrier liquid.

4. The process of claim 3 wherein said carrier liquid is selected from the group consisting of water, ethylene glycol, propylene glycol, glycerol, methyl alcohol, ethyl alcohol, isopropyl alcohol and mixtures thereof.

5. The process of claim 4 wherein said carrier liquid is propylene glycol.

6. The process of claim 4 which is further characterized to include the step of ball milling said mixture prior to carrying out step (a).

7. The process of claim 6 wherein said mixture is further characterized to include an inorganic filler selected from the group consisting of titanium dioxide, ferric oxide, cobalt oxide, zinc oxide, molybdenum disulfide, graphite, carbon black, calcium carbonate, silica and mixtures thereof.

8. The process of claim 7 wherein the heating of said mixture in accordance with step (b) is carried out at a temperature of at least 280° C. and less than 60 minutes.

9. The process of claim 1 wherein:

said unsubstituted para-aromatic sulfide repeating units of said first and second arylene sulfide copolymers are unsubstituted p-phenylene sulfide repeating units;

said unsubstituted ortho-aromatic sulfide repeating units of said first arylene sulfide copolymer are unsubstituted o-phenylene sulfide repeating units; and said alkyl-substituted aromatic sulfide repeating units of said second arylene sulfide copolymer are p-xylene sulfide repeating units.

10. The process of claim 9 wherein:

said first arylene sulfide copolymer has in the range of from about 80 mole % to about 90 mole % unsubstituted p-phenylene sulfide repeating units in the polymer chain and in the range of from about 20 mole % to about 10 mole % unsubstituted o-phenylene sulfide repeating units in the polymer chain and said second arylene sulfide copolymer has in the range of from about 80 mole % to about 90 mole % unsubstituted p-phenylene sulfide repeating units in the polymer chain and in the range of from about 20 mole % to about 10 mole % p-xylene sulfide repeating units in the polymer chain.

11. The process of claim 10 wherein said first arylene sulfide copolymer is present in said mixture in an amount of about 50% by weight based on the combined amount of said first and second arylene sulfide copolymers present in said mixture.

* * * * *